United States Patent
Bohman et al.

(10) Patent No.: US 7,252,571 B1
(45) Date of Patent: Aug. 7, 2007

(54) DEER RATTLE

(76) Inventors: Gregory P. Bohman, 30 N. Township Line Rd., Batesville, IN (US) 47006; Richard H. Heimbrock, 1041 Pineknot Dr., Cincinnati, OH (US) 45238

(*) Notice: Subject to any disclaimer, the term of this patent is extended or adjusted under 35 U.S.C. 154(b) by 10 days.

(21) Appl. No.: 11/139,384

(22) Filed: May 31, 2005

(51) Int. Cl.
*A63H 5/00* (2006.01)
(52) U.S. Cl. .................. 446/421; 446/418; 84/403
(58) Field of Classification Search ........ 446/397, 446/419, 418, 420, 421, 422; 84/402–404, 84/408, 286
See application file for complete search history.

(56) References Cited

U.S. PATENT DOCUMENTS

| | | | | |
|---|---|---|---|---|
| 2,052,405 A | * | 8/1936 | Keller | 446/418 |
| 2,770,159 A | * | 11/1956 | Kato | 84/404 |
| 3,084,478 A | * | 4/1963 | Burger | 446/140 |
| 3,478,932 A | * | 11/1969 | Phillips | 222/192 |
| 5,237,903 A | * | 8/1993 | Bein et al. | 84/404 |

* cited by examiner

*Primary Examiner*—Kien Nguyen
(74) *Attorney, Agent, or Firm*—Neal O. Willmann

(57) ABSTRACT

A device for the simulation of the sound of interacting antlers which comprises a plurality of bound rods encircling a cam rod, and wherein the cam rod is attached to a crank, and wherein the crank extends from its attachment to the cam rod to facilitate manipulation. And, the crank, when rotated, rotates, in turn, the cam rod among the bound rods to create the simulated sound of interacting antlers.

6 Claims, 3 Drawing Sheets

DEER RATTLE

FIELD OF THE INVENTION

This invention relates generally to a device, which when activated, creates a sound that simulates the clanging of deer antlers. The sound of interacting or clanging deer antlers is known to attract other deer, so a hunter who can successfully mimic the sound of clanging antlers will more than likely attract deer to his stand or blind. Simply tapping discarded antlers together has been known to effectively attract deer, but because deer have an acute sense of sight, the successful hunter will strive to minimize movement while tapping antlers or activating any of a variety of clanging antler simulators. The disclosed device is a clear improvement over the devices of the prior art because it effectively simulates the sound of interacting antlers and can be activated with the subtle movement of no more than the digit of a hand. To appreciate the disclosed invention, it is necessary to consider briefly the teachings of the prior art.

DESCRIPTION OF THE PRIOR ART

U.S. Pat. No. 6,289,626, which issued to Williams on Sep. 18, 2001, describes an apparatus for simulating the sound of rattling antlers that can be operated remotely.

U.S. Pat. No. 6,234,865, which issued to Battey on May 22, 2001, describes a deer call utilizing a bag containing a plurality of discreet, artificial antler components in an abutting relationship. Shaking the bag causes the abutting components to interact and generate a noise that allegedly simulates the sound of deer antlers interacting.

U.S. Pat. No. 6,003,261, which issued to French on Dec. 21, 1999, describes a deer decoying device housing a striker that impacts a series of protrusions and mimics the sound of clashing antlers. The device can also be remotely activated.

U.S. Pat. No. 5,928,056, which issued to Molotschko on Jul. 27, 1999, describes a device having tapered beams and tines that can be used by hunters to create sounds resembling the clashing of antlers to attract deer or elk. The device is designed to be disassembled for easy transport.

U.S. Pat. No. 5,019,008, which issued to Hughes on May 28, 1991, describes an attracting device for ruminant animals comprising a pair of elongated corrugated elements that can be stropped to produce the sound of deer antler gashing. At least one of the elements also has an air-driven mechanism that produces a sound similar to the vocal sounds of a deer.

And, U.S. Pat. No. 4,850,928, which issued to Stewart on Jul. 25, 1989, describes a pair of synthetic antlers, each of which includes at least a handle and two tines, one of the antlers having fins along the tines and upon clashing/striking the antlers together, the fins produce sounds effective for rattling-in deer, elk and like antlered animals.

SUMMARY OF THE INVENTION

Notwithstanding the variety of devices and techniques disclosed and described in the prior art, all of which make credible claims for the simulation of the clanging of antlers, there remains a need for a relatively simple device that is easy to transport and even easier to operate, especially by a hunter blending in with his environment and wishing to draw no attention to himself by needless movement or activity. The disclosed device, in its simplest embodiment, simulates the sound of interacting antlers, typically deer antlers, by permitting the hunter to discretely rotate a centrally positioned cam element surrounded by snugly-not tightly bound rods of no particular shape, size or density, thus effecting the simulated sound.

Preferably, the disclosed device comprises: a container housing a plurality of bound rods encircling a cam rod or element. The cam rod is attached to a crank and the crank extends from its attachment to the cam rod within the container to the outside of the container to facilitate manipulation. And, as indicated, the crank, when rotated, rotates, in turn, the cam element among and along the sides of the bound rods to create the simulated sound of interacting antlers.

DESCRIPTION OF THE PREFERRED EMBODIMENTS

Figure 1:
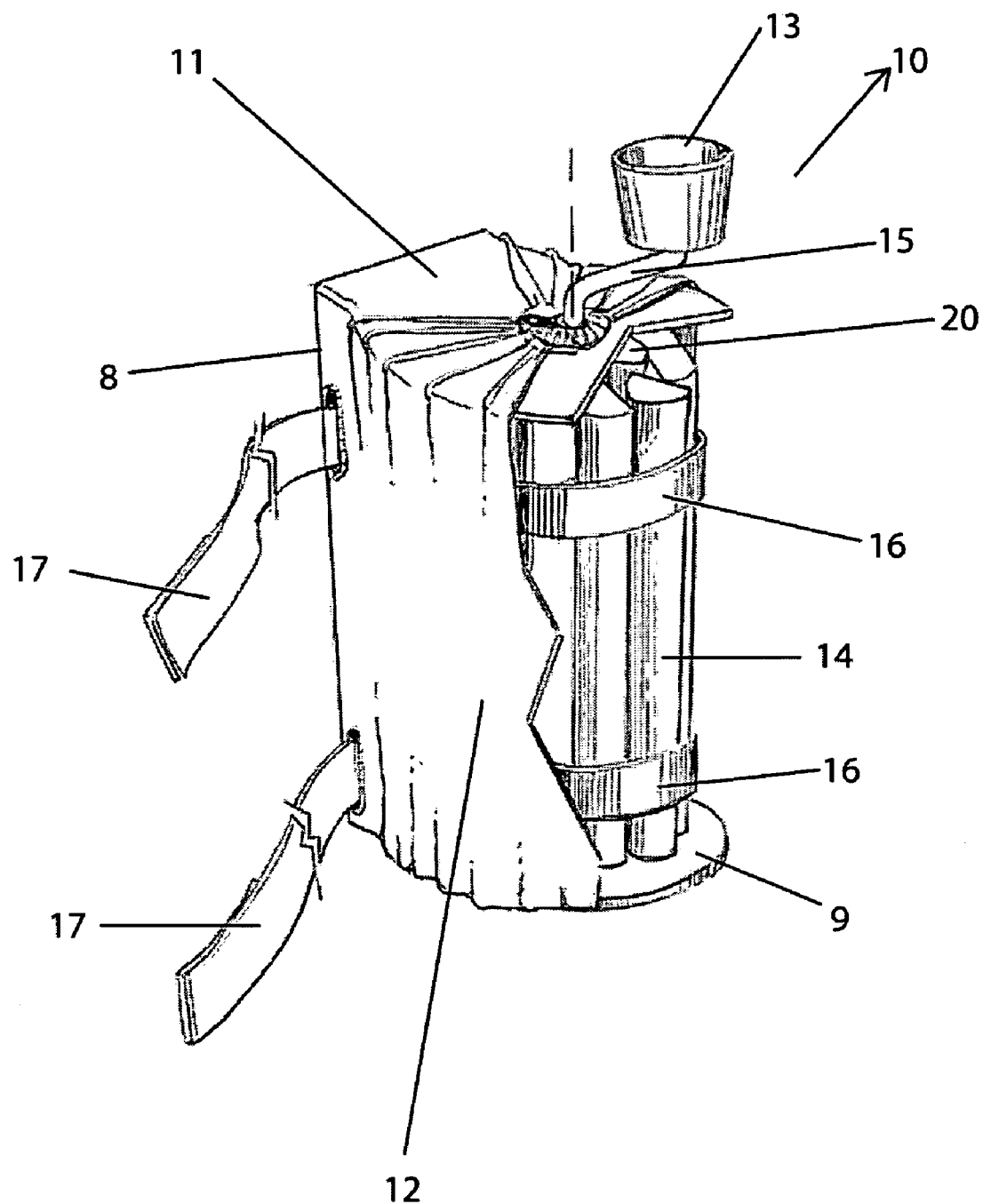
FIG. 1 is a perspective view of the disclosed rattle in partial section illustrating all of the essential elements and where the simulated sound producing elements are contained in a cloth container.

A full appreciation of the disclosed device is most easily attained by referring to the drawing. FIG. 1 is a perspective view in partial section to illustrate all of the components of the device 10. Essentially, the device 10 comprises a plurality of rods 14 bound together and held in place by a binding means 16. Encircled by the bound rods 14 is a cam 20 attached to a crank 15, which when turned or rotated, turns and rotates the attached cam 20. To facilitate the rotation of the crank, a handle or knob 13 is affixed to the distal end of the crank 15. The knob 13 is preferably cup-shaped, i.e., having a depressed center section for the insertion of a finger for the rotational manipulation of the crank 15.

In a preferred embodiment of the disclosed device 10, the bound rods 14 are encased or enclosed within a container 12 with a top portion 11, a bottom portion 9 and a side portion 8. The disclosed device 10 can, of course, be hand carried and held, but in a preferred embodiment, the device 10 is equipped and fitted with attachment means 17, typically fixed to the container 12 for attaching the device 10 to a limb, preferably the leg, of a hunter. While it is preferable that the device 10 be attached to the leg of the hunter, it is desirable that the container 12 be positioned at a slight distance from the leg to prevent the clothed leg from muffling the simulated sound. This desired positioning of the device 10 is apparent from the embodiment illustrated in FIG. 1, which shows the top 11 and bottom 9 aspects of the container 12 extending beyond the side of the container to provide the desired space between the device 10 and the hunter's leg.

Figure 2:
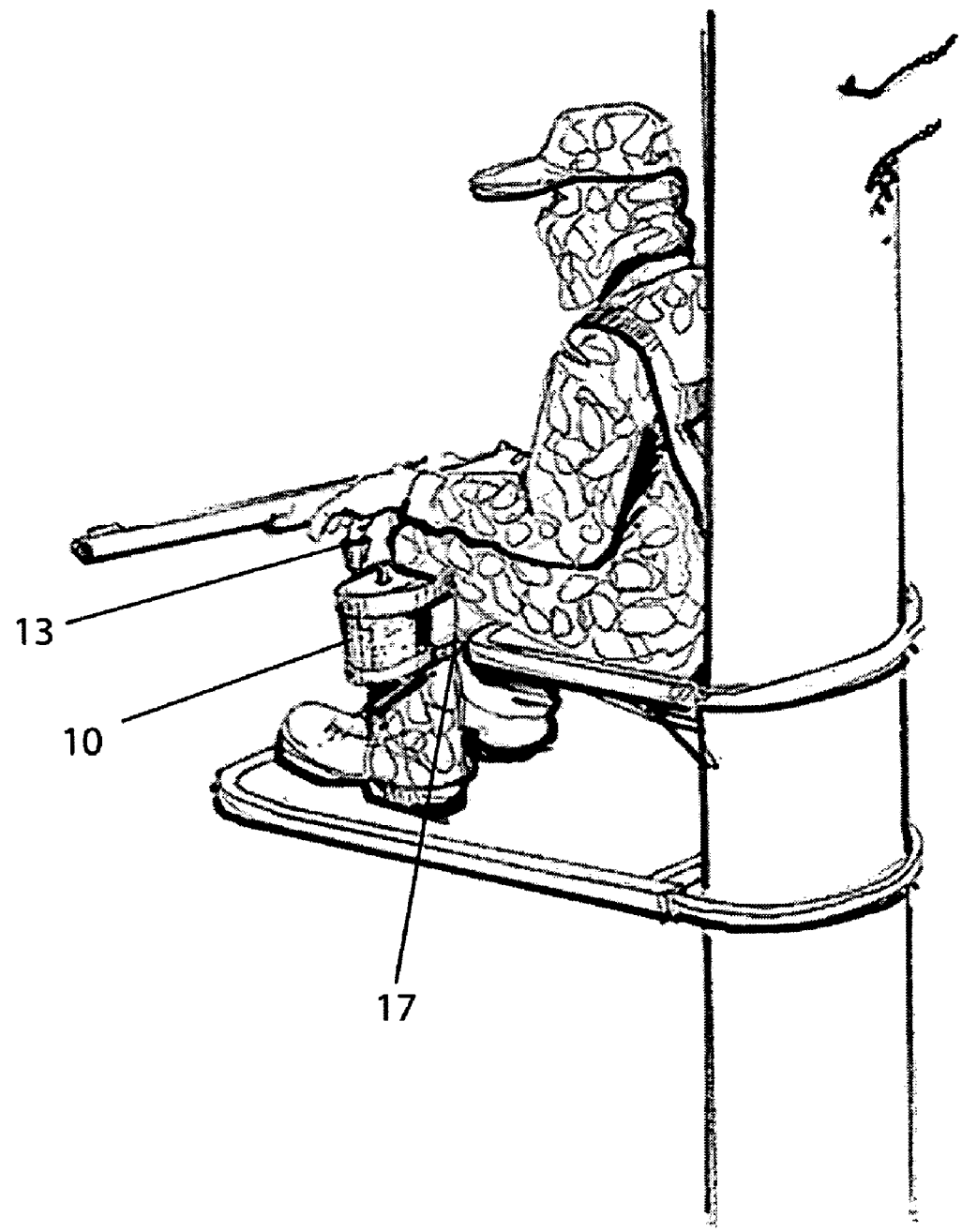
FIG. 2 illustrates a preferred deployment of the disclosed rattle, i.e., strapped to the leg of a hunter in a deer stand, and FIG. 3, views a, b and c, illustrates multiple top plan views of cross sectional schematics of the interior of the disclosed rattle depicting the rotation of the centrally positioned cam rod among the surrounding bound rods.

FIG. 2 illustrates a deployment of the disclosed device 10 in a preferred setting: a deer hunter sitting quietly and patiently in a deer stand waiting for his quarry. The device 10 is strapped to the leg of the sitting hunter with attachment means 17, and the hunter is shown manipulating the device 10 by turning knob 13 with the movement of a single digit or finger. By activating the device with the subtle and unobtrusive movement of a mere finger, for example, the hunter minimizes the likelihood of creating movement that will alarm or startle his prey.

Figure 3:
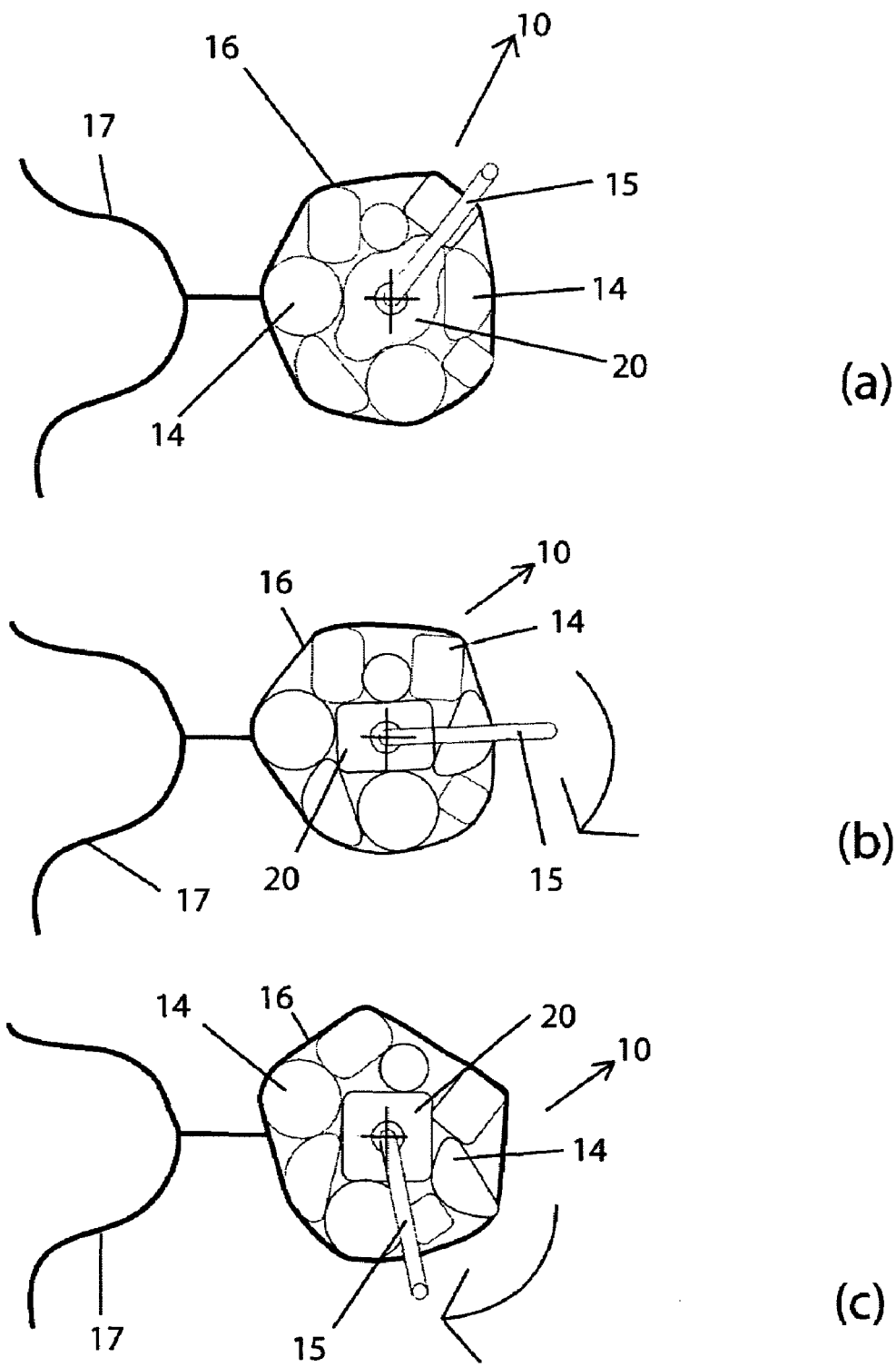

FIG. 3 presents a schematic depiction of the actual "workings" of the disclosed device. FIGS. 3(a), (b) and (c) illustrate the clockwise turning of the crank to rotate the cam 20 within and among the bound rods 14. It is the rotation of the cam 20 against the sides of the snugly bound rods 14 that produces the simulated sound of clanging antlers. The simulated sound created by the movement of the cam 20 among and against the sides of the bound rods 14 can be varied and altered by varying the speed of rotation of the cam and modulating the shapes and densities of the bound rods 14. The rods 14 cannot be so tightly bound as to restrict movement of the cam and the rods, but the device performs best when the rods are bound tightly enough, preferably by a flexible binding means 16, to effect the desired simulated sound. Examples of a flexible binding means include any of a variety of rubber or elastic bands. A flexible binding means 16 holds the rods together and binds them snugly to the cam while permitting the cam to rotate, with a predetermined resistance, against the sides of the rods 14 thus creating the simulated sound of interacting antlers. In the preferred embodiment of FIG. 1 the rods 14 are bound with a pair of elastic bands 16, but neither the number nor the precise elasticity of the flexible binding means is critical. It is only necessary that the rods be bound snugly around the cam and yet allow the cam to rotate within the bound rods.

With further regard to the elements of the disclosed device 10, the rods 14 can be any shape or size, but rods having irregular or angular shapes provided the most interaction, and sound, when encountering the rotating cam 20. Currently, the rods are made from a plastic or resinous material to provide a hardness resembling that of a deer antler. The cam 20, or cam rod, is typically made of the same material as the rods 14, and can be of any practical size or shape suitable for effecting sufficient peculiar movement relative to the surrounding rods 14 to produce the simulative sound of interacting antlers. Currently the preferred cross sectional shape of the cam is oblong and lobular, meaning that it is longer in one direction than in the other, and has a pair of protruding lobes, and the interacting rods have soft, not angular, edges that "catch" the cam as it rotates However, the precise design or shape of the cam is unimportant. A cam having a square or rectangular shape will also interact with the rods 14 to simulate the desired sound. It is only necessary that the cam 20 function as a cam relative to the surrounding snugly bound rods 14 to produce the desired simulated sound.

The rods 14 and cam 20 are preferably positioned within a container 12 having a side portion 8, a top support 11 and a bottom support 9. The container can be made of any of a variety of metal, plastic or fabric materials and typically will be designed to fit securely around the rods 14 to prevent them from rotating with the rotation of the cam 20. A preferred covering or container 12 for the disclosed device 10 is a woven, stretchable cloth material fashioned into a bag-like container in drab olive or camouflage. Metal or plastic containers will also adequately house the functional components of the rattle 10 and can be perforated to allow the simulated sound to be more easily transmitted.

The rattle device 10 is also preferably fitted with an attachment means 17 for attaching the device to the leg or arm of a hunter or to any stationary object, such as the hunter's tree stand. Typically the attachment means 17 will be equipped with a buckle fastener or a hook and loop fastening mechanism such as Velcro to facilitate strapping the device to the body or stationary object.

While the foregoing is a detailed and complete description of the preferred embodiments of the disclosed deer rattle, it should be apparent that numerous variations and modifications can be made and employed to implement the all-important purpose of the deer rattle without departing from the spirit of the invention, which is fairly defined by the appended claims.

The invention claimed is:

1. A device for simulating the sound of interacting antlers which comprises:
    a plurality of rods bound together by an elastic band;
    a cam encircled by and in contact with said bound rods and wherein said bound rods and encircled cam are enclosed within a stretchable fabric bag; and,
    a crank attached to and extending from said cam for manipulation so that when said crank is rotated, said cam is rotated within said bound rods to create the simulated sound of interacting antlers.

2. The device according to claim 1 wherein the crank terminates in a knob for digital manipulation.

3. The device according to claim 2 wherein the knob is cup-shaped.

4. The device according to claim 1 wherein a cross section of the cam has a lobular shape.

5. The device according to claim 1 wherein a cross section of the cam has a square shape.

6. The device according to claim 1 wherein a cross section of the cam has a rectangular shape.

* * * * *